Patented Feb. 16, 1943

2,311,244

UNITED STATES PATENT OFFICE 2,311,244

METHOD OF MAKING FRICTION MATERIAL

Izador J. Novak, Trumbull, Conn., assignor to Raybestos-Manhattan, Inc., Bridgeport, Conn., a corporation of New Jersey No Drawing. Application February 9, 1939, Serial No. 255,453

10 Claims. (Cl. 92—21)

This invention relates to an improved friction material suitable for clutch facings, brake linings and the like, and particularly to a dense, non-woven asbestos base material of the wet machine board type and the novel method of manufacturing same.

Present day automotive requirements and usages with attendant high speeds and increased power make it essential that their friction elements such as the brake linings and clutch facings possess high durability under severe frictional use, that they have a smooth frictional action and a low amount of abrasiveness so that the scoring tendencies and moisture producing characteristics are reduced to a minimum, that their frictional coefficient be maintained in a high range, that they be waterproof and that in meeting all of these requirements the durability of the element be not sacrificed.

It is well known in conventional practice to prepare an asbestos board containing small amounts of sizing and/or modifying ingredients and thereafter to cut this board into suitable blanks which later can be formed or finished to the shape of the friction element. These intermediate blanks are then impregnated with a binder such as asphalt, drying oil, drying oil-synthetic resin or the like dissolved in a solvent to form a varnish which can be oxidized to form the binder for the asbestos structure.

It is well known that, in friction elements of the type herein set forth, durability is a function of compactness, yet the conventional method of their production hereinabove set forth has been found to have certain limitations, particularly in this regard, and high durability has been found to be lacking under severe frictional use. The limitations in the aforesaid method are that the untreated stock offers increasing difficulty to uniform saturation if its compactness is increased and its pore space thereby lessened, for in order to obtain the necessary binder content the concentration of the saturant must be increased as the pore space decreases. Such increase in concentration of the saturant, together with the smaller pores, results in poorer ventilation of the interior of the structure during the oxidation-hardening of the binder, which means that the curing time is greatly lengthened and caused to be less uniform than when normal lower densities and lower saturant concentrations are used.

Of course, the normal conditions may be employed as to compactness of the board and saturant concentration followed by an interruption of the cure for a compression operation, but this is also highly undesirable because of the careful selection necessary of the point of interruption, since the partly cured material must be exactly suited to the pressing conditions, that is, it must be soft enough to compress under the conditions of pressing, must be sufficiently cured so that it does not crush or distort or exude saturant, and must be perfectly uniform in compressibility from piece to piece. These conditions are rarely attained in production so that this type of operation is usually a compromise, resulting in a definite average loss of pieces which are either incompressible or which are distorted during the pressing.

It will be seen from the above that past practice has left it difficult to produce a dense, unwoven structure of wet machine construction.

It is therefore an object of this invention to produce friction materials such as for clutch facings, brake linings and the like, of wet machine board type felted construction which have a high binder content and yet have a great degree of compactness.

Another object of this invention is to provide a non-woven asbestos base friction element bearing characteristics of wet machine board construction wherein the fibres are pre-saturated with and have intimately attached to them a varnish type base binder and which can be cured to waterproof state to result in an element which has smooth frictional action and less abrasiveness than in the case of the saturated structures, and which has greatly reduced scoring and noise producing characteristics.

Another object of my invention is to produce a friction element of felted structure wherein the binder material is pre-associated with the fibres so as to limit the necessity for close control of the saturation operations and thereby reduce operation and handling costs below those of board saturation methods.

Other objects relate to various details of construction and economies attendant thereto and the various novel steps and details in carrying out the process of production.

In general my method comprises the intimate mixing and association with fibrous asbestos and attaching to the fibres thereof a varnish base binder which may comprise a drying oil such as Chinawood oil and an asphaltic material such as gilsonite, or their equivalents or well known substitutes. These binder materials may be distended in a suitable solvent such as a light gasoline, or may be distended by means of an emulsifying agent, and suitable treatment carried out as will be hereinafter set forth to set the varnish on the fibres by partial hardening of the varnish due to oxidation, and if considered desirable or necessary by reason of the gumming tendencies of the varnishes, suitable protective agents may be incorporated. After dissipation of the major portion of the solvents when used in large quantity and by breaking of the emulsion when utilized, the mass is beaten in an engine with water to form an aqueous suspension after which it is run off on a wet machine to form sheets therefrom of varying thicknesses as desired. After removal of the sheets they are subjected to slow compression by means of, for example, a hydraulic press to expel free water therefrom and to cause the binder particles by their residual adhesiveness to cohere and to produce a sheet of a high degree of compactness. Thereafter suitable and desirable friction elements are formed and shaped from these so compacted sheets, and thereafter the shaped elements are subjected to drying action and a binder cure.

As one example of my method I combine 70 parts of asbestos with 120 parts of a varnish containing 20 Chinawood oil, 10 gilsonite and 90 light gasoline in a suitable mixing device such as a change can mixer or a dough mixer. When the fibre is well covered by the varnish, I apply heat to evaporate the solvent and to set the varnish on the fibres by partial hardening of the varnish due to oxidation. This heating must be continued sufficiently to set the binder to a hardness which will avoid later loosening of binder and dirtying of paper machine felts thereby, and not to the degree of dryness where the necessary adhesiveness to make a firmly bonded pressed sheet is impaired. Also the fibres become too waterproof to form a smooth pulp with added water if the heating is excessive. After removal of most of the solvent in this manner, I may add water and allow this to thoroughly wet the coated fibres. This mass is then placed in a conventional beating engine and beaten for a short time with added water to reduce any small lumps which may have formed in the mixing operation to a fibrous condition suitable for running on a wet machine. This beater stock may then be run off into sheets on a wet machine of conventional construction in the ordinary way. These sheets now contain on a dry basis 70 asbestos fibre, 20 partly dried Chinawood oil and 10 gilsonite.

If there is any tendency to gum the cylinder mold or blanket, silicate of soda in the proportion of 5% of the varnish is added to the aqueous mass in the mixer and precipitated on the varnish-coated fibres with alum. As a protective, boiled starch, locust beam gum precipitated with borax, and other non-sticky protectives may be similarly employed. Additional beater treatment of this same type may also be used. However, if the varnish or binder had been carried to a satisfactory gummy state in the mixer prior to the paper-making operation very little, if any, protective is required.

After removal of the sheets from the makeup roll of the wet machine, they are placed between blankets in a stack and this stack compressed slowly in a hydraulic press to remove free water, to cause the previously dissociated binder particles to cohere, and to condense the sheets to a high compactness. The water content in the above uncompressed sheet is approximately 18% and is reduced by compression to about 8%.

By this economical method of pressing, the density of the pressed sheet when dried is of the order of 0.90 to 1.00 ounce per cubic inch, whereas the practical commercial density of a conventionally saturated and cured friction element is about 0.80–0.85 ounce per cubic inch.

After the sheets are removed from the press, they may be cut into brake strips or annular blanks and the scrap returned to the beater for further work. This scrap, as long as it has not been allowed to lose its water content by drying, is easily reworkable by heating. If it is allowed to dry, it will, of course, become completely waterproof and unsuitable for reworking.

The cut blanks are then formed into curved shapes in the case of the brake strips, or stacked in a pack in the case of the clutch facing blanks, and are cured in ovens, the drying of the water and the further oxidation or heat setting of the binder being carried out in one continuous operation. A further small gain in density may be obtained by compressing these strips just after the water has been dried out and before curing the binder. When the cure is complete, the surface finishing operations, drilling and counter-sinking are carried out.

The final product is a material of much greater compactness than could previously have been prepared by the methods discussed in the preamble of this specification, and the binder remains firmly attached to the fibres and is not disturbed in the subsequent pulping and beating to form the pulp suspension.

Due to its presaturated structure, the binder content can be and has been increased over that of the saturated type, which increase results in smooth frictional action and less abrasiveness than in the case of the saturated structures, with an improvement in non-scoring and noise-reducing characteristics.

Because of its felted structures, the product is much stronger than in the case of extruded or molded pulp structures of similar composition. It eliminates control of saturation operations and thereby reduces handling and operational costs below those of the board saturation method.

With respect to its frictional characteristics besides the reduction of abrasiveness described above, it has shown an excellent freedom from fade after normal use and fade due to abuse. Also, the frictional coefficient may be maintained in a range considerably higher than the range normally associated with unwoven friction materials without sacrifice in durability. This is probably due to the fact that the binder distribution is regularly ununiform because of the association of the binder with the fibre in a mixing operation compared to the uniform distribution in the conventional saturated structure, and the fact that more free asbestos is therefore present on the friction surface.

Since the process of mixing with, and oxidizing the binder in the presence of, fibre results in discontinuous bits and shreds of soft binder ranging from viscous oil to gel surrounding and attached to fibres in small clumps of relatively irregular binder distribution it is a characteristic of the final sheet that when these small clumps are later massed into a sheet that this same binder distribution will remain. Therefore the sheet does not have the characteristics of a sheet containing drying oil introduced by saturation and drying in which the binder is in film form, but rather the appearance of asbestos paper with relatively irregular binder distribution.

As alternate methods of producing the treated fibre, the oil-asphalt mixture, either with or without a small amount of solvent, may be mixed with the asbestos, and dilute silicate of soda added in quantities sufficient to emulsify the varnish base and distribute the emulsified material throughout the fibre. Alum solution may then be added to precipitate the emulsion and the protective silicate. Heating may or may not be employed, depending on the gumminess of the oil-asphalt mixture. The main consideration in preparing the varnish-treated fibre is that the varnish be sufficiently tightly adherent to the fibre so that the presence of water does not loosen it therefrom during the paper-making operations.

I find that the silicate-alum treatment is very much more effective when applied in the concentrated fibre condition which exists in the mixer than if it were subsequently applied in the beater, and it is therefore possible to use smaller quantities than have been used in the application of beater protectives to facilitate the running of sticky fibre-binder combinations.

The fibre-varnish mass may be prepared in a mixer of the change can or paint mixer type wherein only a small quantity of solvent is used to spread the varnish through the fibre and the solvent allowed to remain throughout the mixing and paper-making operations. In this case, more protective is required than where the solvent is substantially removed by heat prior to the paper-making operation.

I have described one composition and several methods for preparing the presaturated fibre for the paper-making operation. In similar fashion I may use any of the binders or binder combinations also referred to in the specification and claims as varnish bases known to the friction element art, for example, other asphalts both natural and artificial, natural and artificial pitches, other drying oils, drying oils and synthetic resins, rubber, natural gums and resins, and combinations of these which may be applied in dissolved or emulsified and as generally referred to in the specification and claims as the distended form and attached to asbestos fibre for preparation of friction elements therefrom in the general manner above described. Fillers such as barytes, litharge, graphite, coal, cashew nut shell polymerization products, wood flour and the like may be added to the varnish and carried thereby into the friction material.

I claim as my invention:

1. The method of forming asbestos base friction material of the wet machine type suitable for clutch facings and brake linings, which comprises adding a varnish base binder diluted in a suitable solvent to a mass of fibrous asbestos and intimately mixing said materials, evaporating substantially all of said solvent by heat to partially cure said binder and cause particles thereof to become firmly attached to said fibres, thereafter beating said fibre-binder mass with water to form an aqueous suspension of said binder attached fibres, sheeting out said suspension on a wet machine, slowly compressing the resultant felted sheets to remove free water therefrom and to cohere the binder particles to condense said sheets to high compactness, shaping friction elements from said compacted sheets, and thereafter drying said sheets and curing the binder thereof.

2. The method of forming asbestos base friction material of the wet machine type suitable for clutch facings and brake linings, which comprises adding a varnish base binder diluted in a suitable solvent to a mass of fibrous asbestos and intimately mixing said materials, evaporating substantially all of said solvent by heat to partially cure said binder and cause particles thereof to become firmly attached to said fibres, incorporating therewith and precipating thereon a protective adapted to reduce the gumming tendency of said binder-attached fibres, thereafter beating said fibre-binder mass with water to form an aqueous suspension of said binder attached fibres, sheeting out said suspension on a wet machine, slowly compressing the resultant felted sheets to remove free water therefrom and to cohere the binder particles to condense said sheets to high compactness, shaping friction elements from said compacted sheets, and thereafter drying said sheets and curing the binder thereof.

3. The method of forming asbestos base friction material of the wet machine type suitable for clutch facings and brake linings, which comprises adding a varnish base binder diluted in a suitable solvent to a mass of fibrous asbestos and intimately mixing said materials, evaporating substantially all of said solvent by heat to partially cure said binder and cause particles thereof to become firmly attached to said fibres, adding thereto a limited amount of water to wet said fibres, precipitating on said coated particles a protective adapted to inhibit their resultant adhesibility, thereafter beating said fibre-binder mass with water to form an aqueous suspension of said binder attached fibres, sheeting out said suspension on a wet machine, slowly compressing the resultant felted sheets to remove free water therefrom and to cohere the binder particles to condense said sheets to high compactness, shaping friction elements from said compacted sheets, and thereafter drying said sheets and curing the binder thereof.

4. The method of forming asbestos base friction material of the wet machine type suitable for clutch facings and brake linings, which comprises adding a varnish comprising an asphaltic material and a drying oil in a suitable solvent to a mass of fibrous asbestos and intimately mixing said materials, evaporating substantially all of said solvent by heat to partially cure and set the resultant varnish binder on the fibres, thereafter beating said fibre-binder mass with water to form an aqueous suspension of said binder attached fibres, sheeting out said suspension on a wet machine, slowly compressing the resultant felted sheets to remove free water therefrom and to cohere the binder particles to condense said sheets to high compactness, shaping friction elements from said compacted sheets, and thereafter drying said sheets and curing the binder thereof.

5. The method of forming asbestos base friction material of the wet machine type suitable for clutch facings and brake linings, which comprises adding a varnish comprising an asphaltic material and a drying oil in a suitable solvent to a mass of fibrous asbestos and intimately mixing said materials, evaporating substantially all of said solvent by heat to partially cure and set the resultant varnish binder on the fibres, adding thereto a limited amount of water to thoroughly wet said fibres, thereafter beating said aqueous fibre-binder mass with water to form an aqueous suspension of said binder attached fibres, sheeting out said suspension on a wet machine, slowly compressing the resultant felted sheets to remove free water therefrom and to cohere the binder particles to condense said sheets to high compactness, shaping friction elements from said compacted sheets, and thereafter drying said sheets and curing the binder thereof.

6. The method of forming asbestos base friction material of the wet machine type suitable for clutch facings and brake linings, which comprises adding a varnish comprising approximately ten parts of gilsonite and twenty parts of China-wood oil dissolved in ninety parts of a volatile hydrocarbon to seventy parts of fibrous asbestos and mixing said materials to thoroughly cover the fibres with the varnish, heating said mixture to evaporate a major portion of the solvent therefrom and to set the varnish on the fibres by partial hardening of the varnish due to oxidation, thereafter beating said fibre-binder mass with water to form an aqueous suspension of said binder attached fibres, sheeting out said suspension on a wet machine, slowly compressing the resultant felted sheets to remove free water therefrom and to cohere the binder particles to condense said sheets to high compactness, shaping friction elements from said compacted sheets, and thereafter drying said sheets and curing the binder thereof.

7. The method of forming asbestos base friction material of the wet machine type suitable for clutch facings and brake linings, which comprises adding a varnish comprising approximately ten parts of gilsonite and twenty parts of China-wood oil dissolved in ninety parts of a volatile hydrocarbon to seventy parts of fibrous asbestos and mixing said materials to thoroughly cover the fibres with the varnish, heating said mixture to evaporate a major portion of the solvent therefrom and to set the varnish on the fibres by partial hardening of the varnish due to oxidation, incorporating therewith a limited quantity of water to thoroughly wet the coated fibres, then adding to said aqueous mass silicate of soda in the proportion of approximately five percent of the varnish and precipitating the silicate on the coated fibres by the addition of alum, thereafter beating said fibre-binder mass with water to form an aqueous suspension of said binder attached fibres, sheeting out said suspension on a wet machine, slowly compressing the resultant felted sheets to remove free water therefrom and to cohere the binder particles to condense said sheets to high compactness, shaping friction elements from said compacted sheets, and thereafter drying said sheets and curing the binder thereof.

8. A method for forming an aqueous suspension of fibre in association with binder suitable for sheeting out on a wet machine, which comprises, adding a varnish base binder diluted in a suitable solvent to a mass of fibrous asbestos and intimately mixing said materials, evaporating substantially all of said solvent by heat to partially cure said binder and cause particles thereof to become firmly attached to said fibres, and thereafter beating said fibre-binder mass with water to form an aqueous suspension of said binder attached fibres.

9. A method of forming an aqueous suspension of fibre in association with binder suitable for sheeting out on a wet machine, which comprises, adding a varnish base binder diluted in a suitable solvent to a mass of fibrous asbestos and intimately mixing said materials, evaporating substantially all of said solvent by heat to partially cure said binder and cause particles thereof to become firmly attached to said fibres, adding thereto a limited amount of water to throughly wet the fibres, and thereafter beating said aqueous fibre-binder mass with water to form an aqueous suspension of said binder attached fibres.

10. In a method for forming asbestos base friction material of the wet machine type by sheeting out an aqueous suspension of binder associated fibre, the steps which comprise, intimately pre-mixing fibrous asbestos with a binder comprising a drying oil, the said binder being diluted in a suitable solvent, evaporating substantially all of said solvent by heat to partially cure said binder and cause particles thereof to become firmly attached to said fibres, adding thereto a limited amount of water to thoroughly wet the fibres, and thereafter beating said aqueous fibre-binder mass with water to form an aqueous suspension of said binder attached fibres.

IZADOR J. NOVAK.